(12) United States Patent
Akutsu et al.

(10) Patent No.: US 6,518,687 B2
(45) Date of Patent: Feb. 11, 2003

(54) STATOR FOR STARTER MOTOR

(75) Inventors: Satoru Akutsu, Tokyo (JP); Shigeru Shiroyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/778,057

(22) Filed: Feb. 7, 2001

(65) Prior Publication Data

US 2002/0011756 A1 Jan. 31, 2002

(30) Foreign Application Priority Data

Jul. 27, 2000 (JP) ........................................ 2000-226844

(51) Int. Cl.$^7$ ................................................ H02K 1/00
(52) U.S. Cl. ........................ 310/254; 310/216; 310/218
(58) Field of Search ................................ 310/216, 254, 310/257, 258, 42, 89; 29/596–598

(56) References Cited

U.S. PATENT DOCUMENTS

| | | | | |
|---|---|---|---|---|
| 1,255,606 A | * | 2/1918 | Hensley | ...................... 310/216 |
| 3,908,066 A | * | 9/1975 | Parkinson | .................... 428/379 |
| 4,051,401 A | * | 9/1977 | Hayward | ..................... 310/216 |
| 4,255,684 A | * | 3/1981 | Mischler et al. | ............ 310/216 |
| 4,309,815 A | * | 1/1982 | Schmitt et al. | ................ 29/596 |
| 4,698,539 A | * | 10/1987 | Workman | .................... 310/216 |
| 5,426,337 A | * | 6/1995 | Kobayashi et al. | ........... 310/89 |
| 5,731,646 A | * | 3/1998 | Heinze et al. | ................. 310/89 |
| 6,058,594 A | * | 5/2000 | Neumann et al. | ............ 310/216 |

FOREIGN PATENT DOCUMENTS

JP 62-129259 U 2/1961

* cited by examiner

Primary Examiner—Tran Nguyen
(74) Attorney, Agent, or Firm—Sughrue Mion, PLLC

(57) ABSTRACT

In a stator for a starter motor including an approximately cylindrical yoke, poles disposed inside the yoke, and field windings wound around the poles, the yoke is formed of a plurality of cylindrical cores having a different diameter and stacked in a radial direction to reduce the manufacturing cost of the yoke.

9 Claims, 7 Drawing Sheets

STATOR FOR STARTER MOTOR

BACKGROUND OF THE INVENTION

1. Field of the Invention

The present invention relates to a stator for a starter motor used in vehicles and the like, and more particularly, to a stator for a starter motor having a cylindrical yoke.

2. Description of the Related Art

FIG. 7 is a perspective view showing a structure of a stator for a conventional starter motor; FIG. 8 is a plan view of the stator; and FIG. 9 is a perspective view showing an assembly process of the stator.

In a conventional stator 101 shown in FIGS. 7 and 8, four poles 103 are disposed inside a cylindrical yoke 102. Then, a field winding 105 is wound around each of the poles 103.

In the conventional stator constructed as described above, the yoke 102 is arranged as a cylindrical yoke ("bent yoke portion") by rounding a sheet member and welding the joints thereof. Spigot portions 104, which are formed at the ends of the yoke 102 in the axial direction thereof so as to be fitted to brackets (not shown), are processed by machining.

The poles 103 are made in a different process by, for example, forging or the like and mounted on the yoke 102 later. Further, the field windings 105 are previously wound in a different process and the spaces between wires are previously subjected to insulation processing by powder coating or the like. The surface of the yoke 102 cannot be previously subjected to rustproof processing because it is bent, welded, drawn and machined. Thus, the yoke 102 is coated with paint upon completion of the processing thereof.

The conventional stator constructed as described above is assembled in such a manner that, first, the field coils 105, which have been previously wounded and subjected to the insulation processing, are mounted on the poles 103 which are mounted on the yoke 102 through mounting holes 110 defined thereto by caulking, screws or the like.

In the stator for the starter motor constructed as described above, the yoke 102 must have a predetermined thickness because a yoke made of a thin sheet member cannot achieve its function. Thus, the yoke 102 is made in such a manner that a thick sheet member is cut off by a large press and gradually rounded so as to be formed in a cylindrical shape, then the cylindrical thick sheet member is welded by a welder and subjected to a drawing process to provide it with accuracy by making the deformed cylindrical member to a perfect cylindrical member. Thereafter, the spigot portions 104 at the ends of the cylindrical member in the axial direction thereof are machined, the mounting holes 110 are drilled to the cylindrical member and painting is applied thereto.

The manufacture of the conventional so-called "bent yoke portion" made as described above requires many dedicated apparatuses such as a large press, welder, surface processing apparatus, outside diameter drawing machine, lathe, drilling machine, painting machine, and the like. Further, many processes are necessary to manufacture the "bent yoke portion" and the respective processing machines are large in size, from which a problem arises in that the manufacturing cost of the "bent yoke" is expensive.

SUMMARY OF THE INVENTION

An object of the present invention, which was made to solve the above problem, is to provide a stator for a starter motor the manufacturing cost of which can be reduced.

In a stator for a starter motor according to the present invention which includes an approximately cylindrical yoke, poles disposed inside the yoke, and field windings wound around the poles, the yoke is formed of a plurality of cylindrical cores having a different diameter and stacked in a radial direction.

It is preferable that the plurality of cylindrical cores be manufactured by a clinch method, respectively.

It is preferable that joints used in the clinch method are located so that they are not overlapped in a circumferential direction.

It is preferable that the axial direction of the innermost core of the plurality of the cylindrical cores be longer than those of the other cores.

It is preferable that the axial direction of the outermost core of the plurality of cylindrical cores be longer than those of the other cores.

It is preferable that the axial direction of the intermediate core of the plurality of cylindrical cores be longer than those of the other cores.

It is preferable that only the outermost core of the plurality of cylindrical cores be composed of a plated steel sheet.

It is preferable that the plating thickness of the outermost core of the plurality of cylindrical cores be larger than those the other cores.

Further, it is preferable that only the outermost core of the plurality of cylindrical cores is composed of a coated steel sheet.

DESCRIPTION OF THE PREFERRED EMBODIMENTS

First Embodiment

Figure 1:
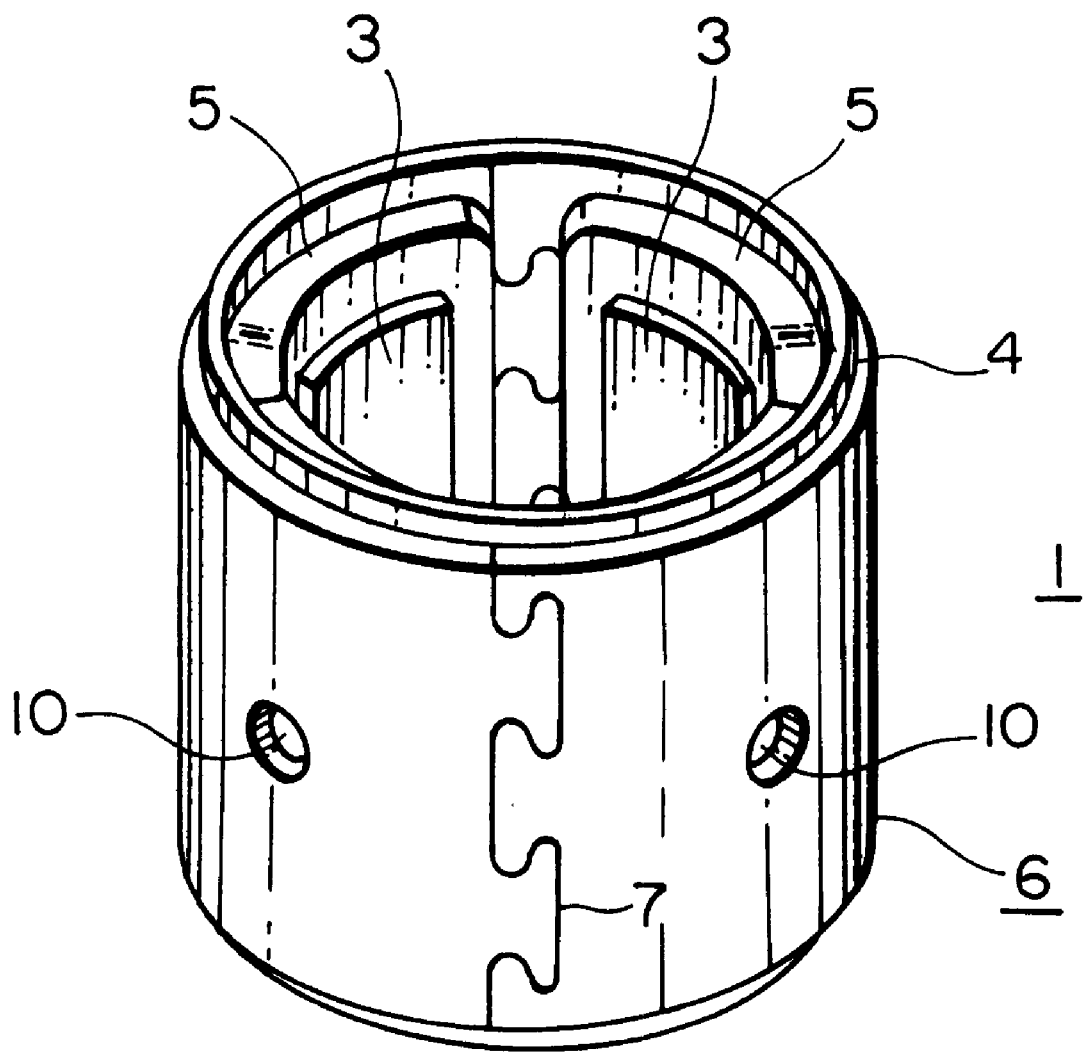
FIG. 1 is an overall perspective view showing a stator for a starter motor of a first embodiment of the present invention.
Figure 2:
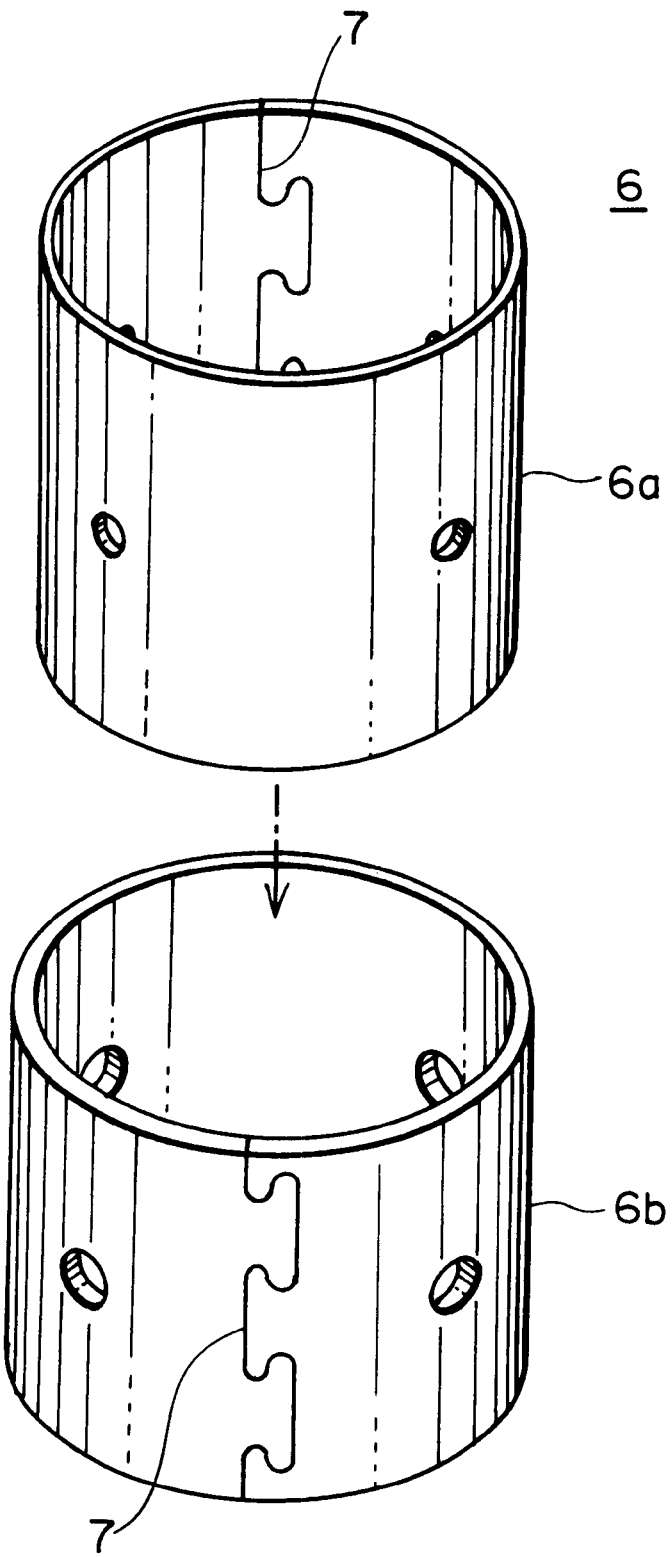
FIG. 2 is an exploded perspective view of a yoke of the first embodiment of the present invention.
Figure 3:
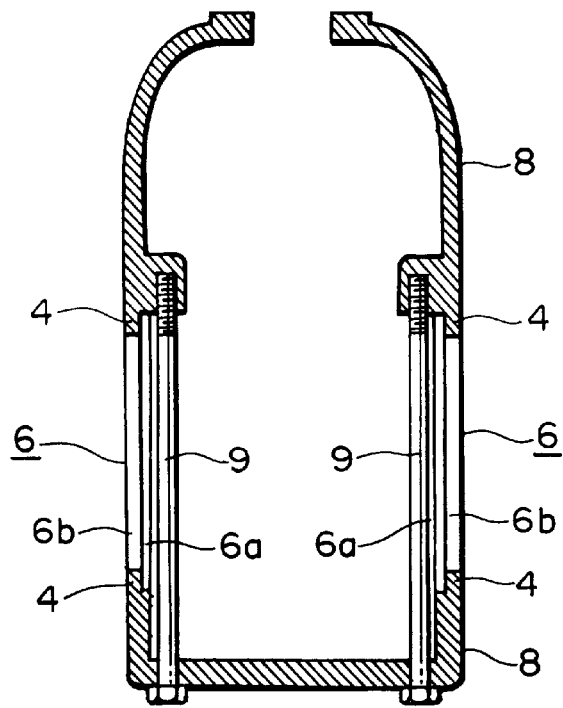
FIG. 3 is a sectional view of the main portion of the starter motor of the first embodiment of the present invention.

FIG. 1 is an overall perspective view showing a stator for a starter motor of a first embodiment of the present invention; FIG. 2 is an exploded perspective view of a yoke of the first embodiment; and FIG. 3 is a sectional view of the main portion of the starter motor of the first embodiment.

In the stator 1 of the first embodiment shown in FIG. 1, four poles 3 are disposed inside a cylindrical yoke 6. Then, a field winding 5 is mounted on each of the poles 3.

The yoke 6 of the first embodiment is composed of two cylindrical cores 6a and 6b having a different outside diameter and stacked. That is, the yoke 6 of the stator 1 is constructed by combining the two inside (6a) and outside (6b) cylindrical cores.

Each of the cylindrical cores 6a and 6b is made of a sheet member by a clinch method. That is, each of the cores 6a and 6b is formed to a cylindrical shape in such a manner that the sheet member is rounded and then jointed at the clinch portions 7 thereof acting as joints. The cores 6a and 6b are aligned so that the clinch portions 7 thereof face each other with respect to a center line.

The axial length of the inner core 6a is made longer than that of the outer core 6b so as to form stepped portions at both the ends thereof when they are combined with each other. As shown in FIG. 3, the stepped portions act as spigot portions 4 which are fitted to two brackets 8.

The core 6a is fixed to the core 6b making use of spring back by slightly weakly clinching the inner core 6a so that the outside diameter thereof is made larger than the inside diameter of the outer core 6b when it is in a free state; or when the poles 3 are fixed to the yoke 6 by caulking or screws, the two cores 6a and 6b also are aligned and fixed to each other at the same time.

The outer core 6b is composed of a coated steel sheet to which plating or coating is previously applied. The inner core 6a is composed to a plated steel sheet the plating thickness of which is smaller than that of the outer core.

Note that, in the first embodiment, while the yoke 6 is formed of the two cores 6a and 6b stacked, the number of cores may be appropriately increased when necessary to secure a necessary thickness.

In the stator 1 for the starter motor constructed as desdcribed above which includes the approximately cylindrical yoke 6, the poles 3 disposed inside the yoke 6, and the field windings 5 wound around the poles 3, the yoke 6 is formed of the two cylindrical cores 6a and 6b having the different diameter and stacked in a radial direction. As a result, the yoke 6 can be manufactured by simple apparatuses such as a multi-purpose press and the like, which can reduce the manufacturing cost of the yoke. Further, a plurality of types of yokes can be manufactured using the same apparatuses and the same materials because the thickness of the yoke 6 can be varied by adjusting the number of cores to be stacked, whereby the manufacturing cost of the yoke can be reduced.

The plurality of cylindrical cores 6a and 6b are manufactured by the clinch method, respectively. As a result, the yoke 6 can be manufactured by the simple apparatuses such as the multi-purpose press, a clinching apparatus, and the like, which can reduce the manufacturing cost of the yoke.

Further, the clinch portions 7 acting as the joints used in the clinch method are located at positions where they are not overlapped with each other in a circumferential direction. With this arrangement, invasion of water and the like from the outside can be prevented, whereby the reliability of the yoke can be improved. Further, magnetic flux paths can be excellently formed because the joints are not overlapped with each other.

The axial length of the inner core 6b is longer than that of the other core in the plurality of cores 6a and 6b. As a result, the stepped portions can be easily formed and used as the spigot portions 4 when the stepped portions are fitted to the brackets 8, which makes it unnecessary to perform conventional machining to make the spigot portions 4 and can reduce the manufacturing cost of the yoke.

The plating thickness of the outermost core 6b is made larger than that of the other core in the plurality of cores 6a and 6b. As a result, only the outer core 6b, which must be most weather-resistant of the plurality of cores, is plated thickly and the other core, to which so strict weather resistance is not required, is plated thinly, which can optimize the plating thicknesses of the cores and reduce the manufacturing cost of the yoke while securing the reliability thereof.

Further, only the outermost core 6b is composed of the coated steel sheet in the plurality of cylindrical cores 6a and 6b. In the manufacture of the yoke, processes such as welding, drawing, and the like, in which paint is exfoliated, are not used because the yoke 6 is formed by stacking the plurality of cores. As a result, it is possible to form the yoke 6 using a precoated material and rust-proofing coating need not be applied to the yoke upon completion thereof, which can reduce the manufacturing cost of the yoke.

Second Embodiment

Figure 4:
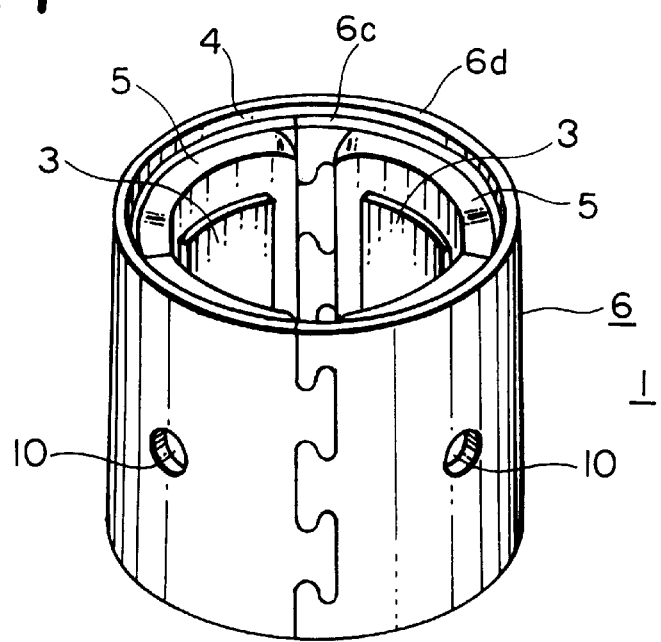
FIG. 4 is an overall perspective view showing a stator for a starter motor of a second embodiment of the present invention.

FIG. 4 is an overall perspective view showing a stator for a starter motor of a second embodiment of the present invention. In the second embodiment, the yoke 6 of the stator 1 is composed of an inner core 6c and an outer core 6d combined with each other.

The axial length of the inner core 6c is made shorter than that of the outer core 6d so as to form stepped portions at both the ends thereof in an axial direction when they are combined with each other. The stepped portions act as the spigot portions 4 when they are fitted to the brackets 8.

Similarly to the first embodiment, the core 6c is secured to the core 6d making use of spring back by slightly weakly clinching the inner core 6c so that the outside diameter thereof is made larger than the inside diameter of the outer core 6d when it is in a free state; or when the poles 3 are secured to the yoke 6 by caulking or screws, the two cores 6c and 6d also are aligned and fixed to each other at the same time.

In the stator for the starter motor constructed as desdcribed above, the axial length of the outer core 6d is longer than that of the other core 6c in the plurality of cylindrical cores 6c and 6d. As a result, the stepped portions can be easily formed and used as the spigot portions 4 when the stepped portions are fitted to the brackets 8, which makes it unnecessary to perform conventional machining to make the spigot portions 4 and can reduce the manufacturing cost of the yoke.

Third Embodiment

Figure 5:
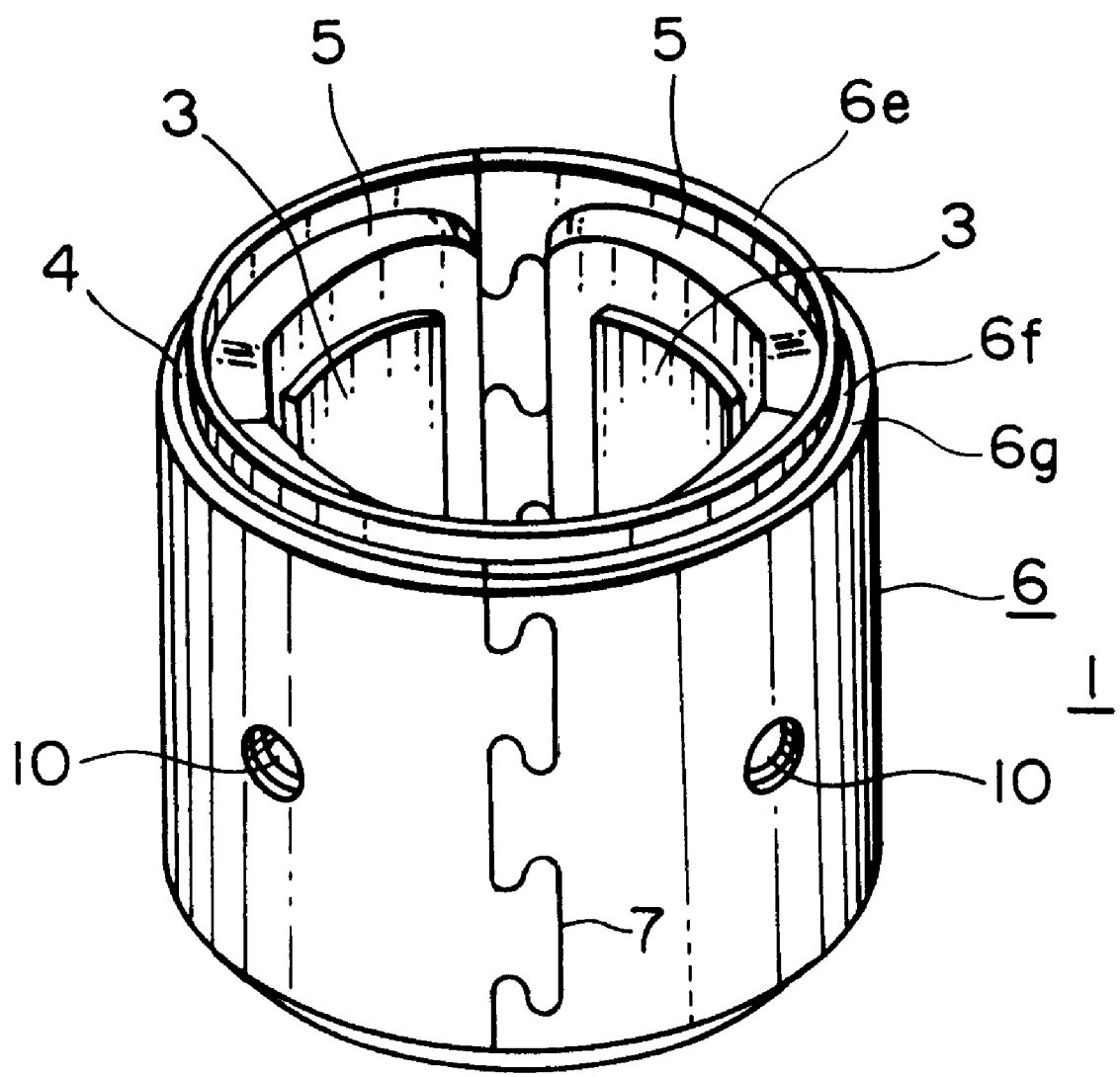
FIG. 5 is an overall perspective view showing a stator for a starter motor of a third embodiment of the present invention.
Figure 6:
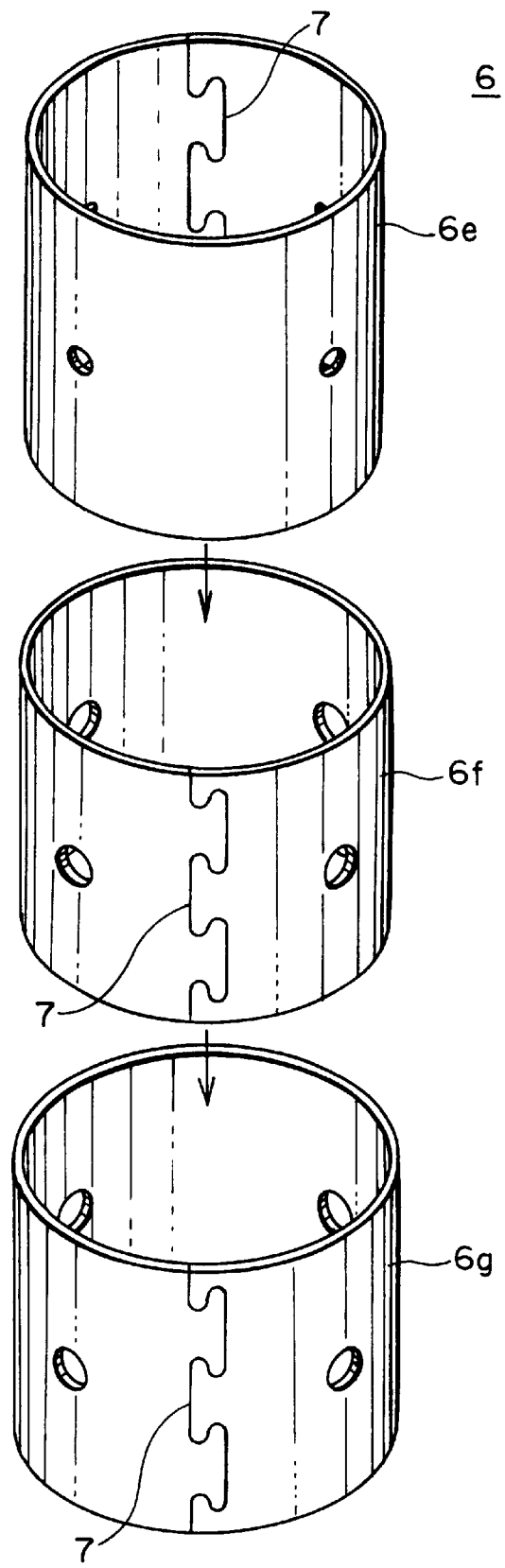
FIG. 6 is an exploded perspective view of a yoke of the third embodiment of the present invention.
Figure 7:
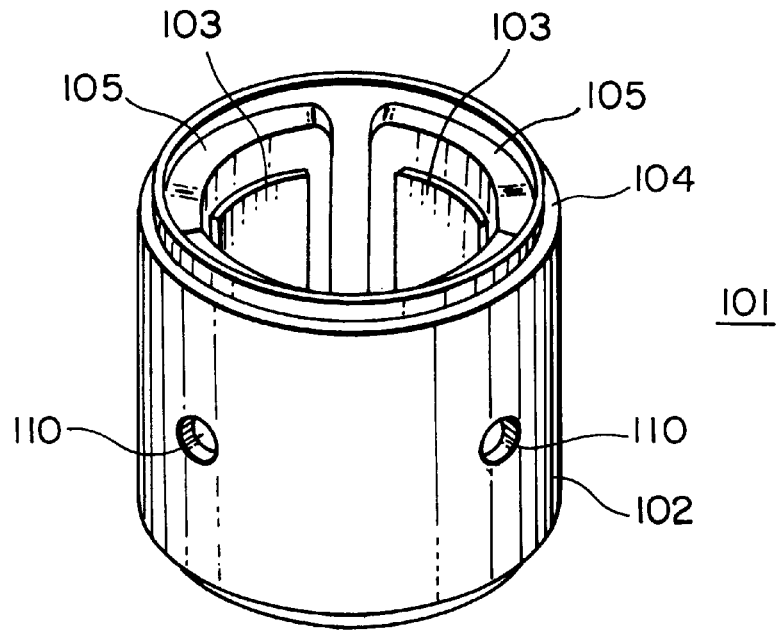
FIG. 7 is a perspective view showing a structure of a stator of a conventional starter motor.
Figure 8:
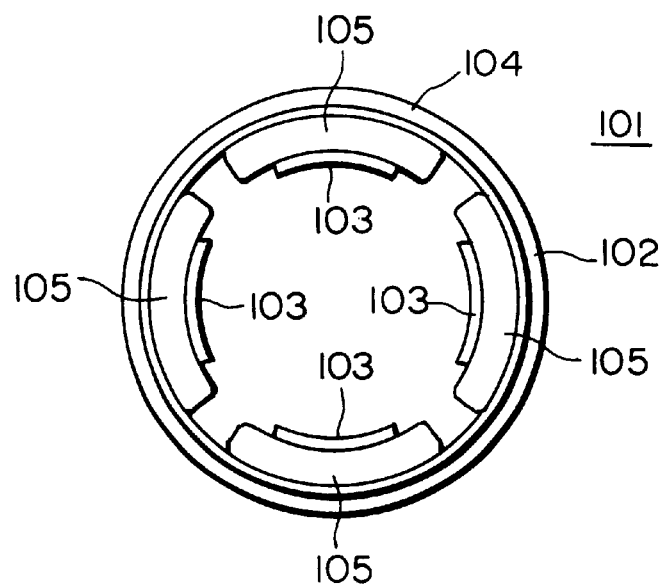
FIG. 8 is a plan view of the conventional stator.
Figure 9:
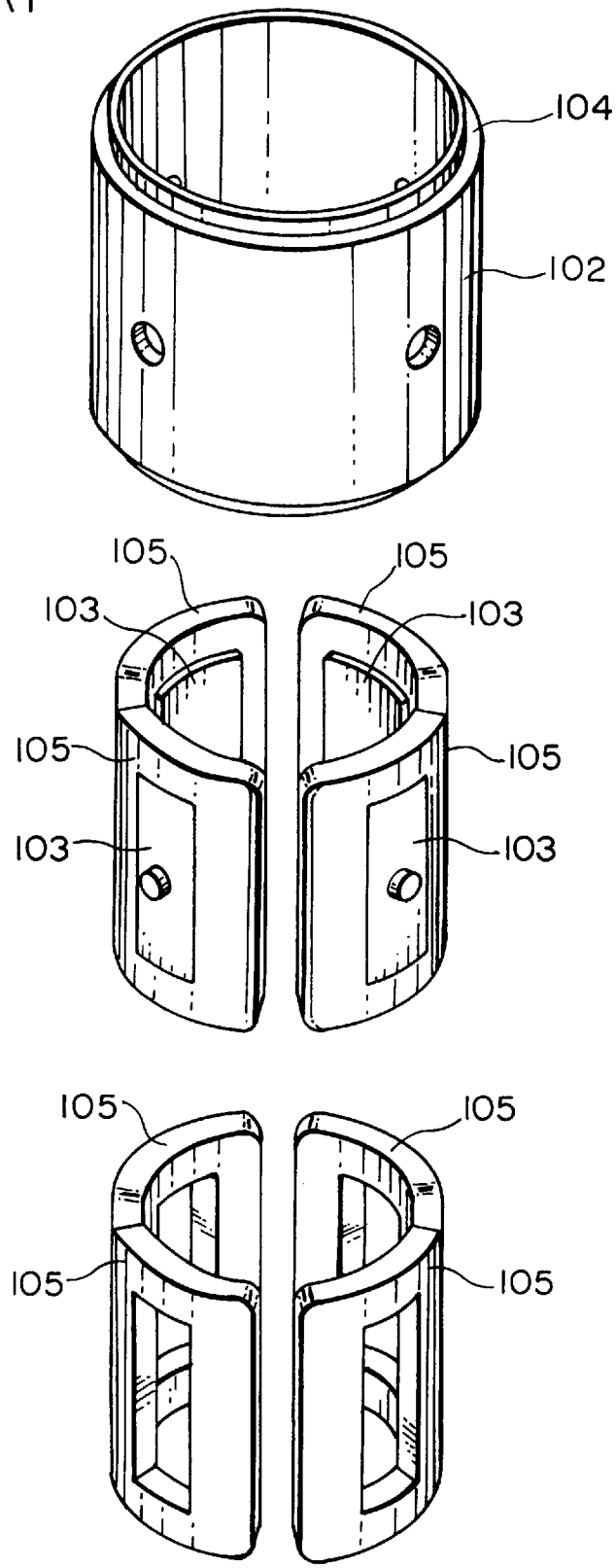
FIG. 9 is a perspective view of showing an assembly process of the conventional stator.

FIG. 5 is an overall perspective view showing a stator for a starter motor of a third embodiment of the present invention. FIG. 6 is an exploded perspective view of the yoke of the third embodiment. In the third embodiment, the yoke 6 of the stator 1 is composed of three cylindrical cores 6e, 6f, and 6g combined with each other.

Only the innermost core 6e is made longer than the other cores 6f and 6g so that stepped portions are formed at both the ends thereof in an axial direction when they are combined with each other. The stepped portions act as the spigot portions 4 when they are fitted to brackets 8.

The cores 6e, 6f, and 6g are fixed to each other making use of spring back by slightly weakly clinching the two inner cores 6e and 6f so that the outside diameters thereof are made larger than the inside diameter of the core 6g when they are in a free state; or when the poles 3 are fixed to the yoke 6 by caulking or screws, the respective cores 6e, 6f, and 6g also are aligned and fixed to each other at the same time.

In the stator for the starter motor constructed as described above, the axial length of the innermost core 6e is made longer than those of the other cores 6f and 6g in the plurality of cylindrical cores 6e, 6f, and 6g. As a result, the stepped portions are formed by making the lengths of the plurality of cylindrical cores different and used as the spigot portions 4 when they are fitted to the brackets 8, which makes it unnecessary to perform conventional machining to make the spigot portions 4 and can reduce the manufacturing cost of the yoke.

Note that while the axial length of the innermost core 6e of the plurality of cores 6e, 6f, and 6g is made longer than those of the other cores 6f and 6g in the third embodiment, the axial length of the intermediate core 6f may be made longer than those of the other cores 6e and 6g. With this arrangement, the stepped portions are formed on the inner side and the outer side of the cores and used as the spigot portions, which can increase a degree of freedom of the spigot portions.

In the stator for the starter motor according to the present invention including the approximately cylindrical yoke, the poles disposed inside the yoke, and the field windings wound around the poles, the yoke is formed of the plurality of cylindrical cores having the different diameter and stacked in the radial direction. As a result, the formation of the yoke of the stator by stacking the plurality of cylindrical cores in the radial direction permits the yoke to be manufactured by the simple apparatuses such as the multi-purpose press and the like, whereby the manufacturing cost of the yoke can be reduced. Further, a plurality of types of yokes can be manufactured using the same apparatuses and the same materials because the thickness of the yoke can be varied by adjusting the number of cores to be stacked, whereby the manufacturing cost of the yokes can be reduced.

The plurality of cylindrical cores are manufactured by the clinch method, respectively. As a result, the formation of the yoke of the stator by stacking the plurality of cylindrical cores by the clinch method permits the yoke to be manufactured by the simple apparatuses such as the multi-purpose press and the like, whereby the manufacturing cost of the yoke can be reduced.

Further, the joints used in the clinch method are located at positions where they are not overlapped with each other in the circumferential direction. With this arrangement, invasion of water and the like from the outside can be prevented. Further, the magnetic flux paths can be excellently formed.

The axial length of the innermost core is made longer than those of the other cores in the plurality of cylindrical cores. As a result, the stepped portions are formed by making the lengths of the plurality of cylindrical cores different and used as the spigot portions when they are fitted to the brackets, which makes it unnecessary to perform conventional machining to make the spigot portions and can reduce the manufacturing cost of the yoke.

The axial length of the outermost core is made longer than those of the other cores in the plurality of cylindrical cores. As a result, the stepped portions are formed by making the lengths of the plurality of cylindrical cores different and used as the spigot portions when they are fitted to the brackets, which makes it unnecessary to perform conventional machining to make the spigot portions and can reduce the manufacturing cost of the yoke.

The axial length of the intermediate core is made longer than those of the other cores in the plurality of cylindrical cores. As a result, the stepped portions are formed by making the lengths of the plurality of cylindrical cores different and used as the spigot portions when they are fitted to the brackets, which makes it unnecessary to perform conventional machining to make the spigot portions and can reduce the manufacturing cost of the yoke. The stepped portions are formed on the inner side and the outer side of the cores and are used as the spigot portions, which can increase the degree of freedom of the spigot portions.

Further, only the outermost core is composed of a plated steel sheet among the plurality of cylindrical cores. Processes such as welding, drawing, and the like, in which plating is exfoliated, are not used in the manufacture of the yoke because the yoke is formed by stacking the plurality of cores. As a result, it is possible to form the yoke using previously plated material and rust-proofing coating so that such need not be applied to the yoke upon completion thereof, which can reduce the manufacturing cost of the yoke.

The plating thickness of the outermost core is made larger than those of the other cores in the plurality of cores. As a result, only the outermost core, which must be most weather-resistant of the plurality of cores, is plated thickly and the other cores, to which so strict weather resistance is not required, are plated thinly, which can optimize the plating thicknesses of the cores and reduce manufacturing cost of the yoke while securing the reliability thereof.

Further, only the outermost core is composed of the coated steel sheet in the plurality of cylindrical cores. Processes such as welding, drawing, and the like in which paint is exfoliated are not used because the yoke is formed by stacking the plurality of cores. As a result, it is possible to form the yoke using the precoated material and rust-proofing coating need not be applied to the yoke upon completion thereof, which can reduce the manufacturing cost of the yoke.

What is claimed is:

1. A stator for a starter motor including an approximately cylindrical yoke, poles disposed inside the yoke, and field windings wound around the poles, wherein said yoke is formed of a plurality of cylindrical cores having a different diameter and stacked in a radial direction.

2. A stator for a starter motor according to claim 1, wherein said plurality of cylindrical cores each include a clinch portion.

3. A stator for a starter motor according to claim 2, wherein said clinch portions of different cores are located so that they are not overlapped in a circumferential direction.

4. A stator for a starter motor according to claim 1, wherein the axial dimension of the innermost core of the plurality of said cylindrical cores is longer than those of the other cores.

5. A stator for a starter motor according to claim 1, wherein the axial dimension of the outermost core of said plurality of cylindrical cores is longer than those of the other cores.

6. A stator for a starter motor according to claim 1, wherein the axial dimension of the intermediate core of said plurality of cylindrical cores is longer than those of the other cores.

7. A stator for a starter motor according to claim 1, wherein only said outermost core of said plurality of cylindrical cores is composed of a plated steel sheet.

8. A stator for a starter motor according to claim 1, wherein a plating thickness of said outermost core of said plurality of cylindrical cores is larger than those of the other cores.

9. A stator for a starter motor according to claim 1, wherein only said outermost core of said plurality of cylindrical cores is composed of a coated steel sheet.

* * * * *